(12) United States Patent
Kim

(10) Patent No.: US 6,668,022 B1
(45) Date of Patent: Dec. 23, 2003

(54) METHOD AND APPARATUS FOR MODIFICATION OF CHANNEL IN DIGITAL TV TRANSLATOR

(75) Inventor: Dong Hyean Kim, Kyoungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/578,729

(22) Filed: May 26, 2000

(30) Foreign Application Priority Data

Aug. 12, 1999 (KR) ........................................ 1999/33174

(51) Int. Cl.[7] ................................................. H04N 7/16
(52) U.S. Cl. ........................ 375/240.27; 348/8; 348/10
(58) Field of Search .................... 375/240.25–240.29; 348/608, 723, 724, 6, 8, 10

(56) References Cited

U.S. PATENT DOCUMENTS

| | | | | |
|---|---|---|---|---|
| 5,734,589 A | * | 3/1998 | Kostreski et al. | ............ 345/716 |
| 5,933,500 A | * | 8/1999 | Blatter et al. | ................ 380/200 |
| 6,401,242 B1 | * | 6/2002 | Eyer et al. | ..................... 725/35 |
| 6,515,712 B1 | * | 2/2003 | Jeong | ......................... 348/608 |

* cited by examiner

Primary Examiner—Andy Rao
(74) Attorney, Agent, or Firm—Fleshner & Kim, LLP

(57) ABSTRACT

The present invention provides a method and apparatus for modifying channel information in a digital translator of a digital communication system so that when a broadcasting signal is transmitted using a transmitting channel different from a receiving channel, the channel information stored in the broadcasting signal can be appropriately modified according to the transmitting channel. A method of operating a digital communication system having a translator related to the present invention includes detecting a start time of a compressed data extracted from a transmitted digital TV broadcasting signal. Then, it is determined whether a channel information stored in the data is identical to the prescribed channel information. When the channel information stored in the data is not identical to the prescribed channel information, the channel information stored in the data is modified according to the prescribed channel information. Since the channel information of the transmitted digital broadcasting signal is modified to the prescribed channel information when a receiver channel of the digital broadcasting signal such as a digital TV is not identical to a transmitter channel of the broadcasting signal, possible instabilities or mix-up due to demodulation of the digital broadcasting signal in the receiving digital TV are prevented. In addition, stable TV broadcasting service is provided.

20 Claims, 2 Drawing Sheets

METHOD AND APPARATUS FOR MODIFICATION OF CHANNEL IN DIGITAL TV TRANSLATOR

BACKGROUND OF THE INVENTION

1. Field of the Invention

This invention relates to a method and an apparatus for digital communications using, for example, channel information in digital TV translator.

2. Background of the Related Art

A digital TV translator is to provide service to a wave shadow area where a digital broadcasting transmitter cannot be reached. Thus, the digital TV translator increases the broadcasting area of the digital TV. The digital TV translator receives a weak broadcasting signal transmitted from the digital broadcasting transmitter and demodulates the received signal thereof before converting it to a base-band of an intermediate frequency. The converted signal is demodulated again to a desired channel frequency and amplified to a signal that subscribers of the wave shadow area can receive.

FIG. 1 shows a related art digital TV broadcasting transmitting system that includes a digital TV translator. Referring to FIG. 1, a digital broadcasting transmitter 100 transmits a broadcasting signal with an F1 frequency. Generally, the digital broadcasting transmitter 100 is placed in elevated areas, such as a mountain or a tall building, to transmit the digital broadcasting signal to the subscribers.

When the digital broadcasting transmitter 100 transmits the broadcasting signal, a subscriber located in the surrounding areas of the digital broadcasting transmitter 100 can directly receive the broadcasting signal through an antenna placed on a roof, a built-in TV antenna or the like. However, those subscribers living in the shadow area with obstacles such as the mountain or the hill or those subscribers distant from the digital broadcasting cannot receive the broadcasting signal transmitted from the digital broadcasting transmitter 100. As a result, digital TV translators 101 to 104 are positioned to translate the broadcasting signal received from the digital broadcasting transmitter 100 using an F2 frequency or an F3 frequency. In addition, digital TV translators 105, 106 can translate a broadcasting signal transmitted from the preceding digital TV translators 103, 104.

Each digital TV translator 101~106 demodulates the broadcasting signal transmitted from the digital broadcasting transmitter 100, and converts into the base-band signal prior to performing an error-correction process. Then, the demodulated signal therein is re-modulated and amplified, and transmitted to the subscribers located in the area where direct transmitting cannot be established. Since the converted base-band signal is identical to the data generated during the transmitting process from the digital broadcasting transmitter 100, it has an identical quality to the broadcasting signal. Therefore, even if the digital TV translators 101~106 repeatedly transmit the broadcasting signal to reach subscribers using a channel different from the channel used by the digital broadcasting transmitter 100, the uniform signal quality can be maintained.

However, as described above, the related art digital TV broadcasting transmitting system has various disadvantages. Since the related art digital TV translators 101~106 translate the broadcasting signal to the subscribers using channels different from the channels used by the digital broadcasting transmitter 100, the actual channel information received by the digital TV of the subscribers is different from that of the channel information stored in the received broadcasting signal. Therefore, instabilities may occur in the subscriber's digital TV during the processing of the received broadcasting signal. As a result of such instabilities, stable digital TV broadcasting may not be established.

The above references are incorporated by reference herein where appropriate for appropriate teachings of additional or alternative details, features and/or technical background.

SUMMARY OF THE INVENTION

An object of the present invention is to provide an apparatus and method for operating a digital communication system that substantially obviates one or more problems caused by disadvantages of the related art.

Another object of the present invention is to overcome the disadvantage of related art methods by providing a method and an apparatus for modification of the channel information in the digital TV translator that can modify the transmitted channel information of the broadcasting signal according to the transmitted channel information being used by the digital TV translator.

Another object of the present invention is to provide a method and an apparatus for modification of channel information in digital TV translator where if a broadcasting signal is transmitted using a transmitting channel different from a receiving channel, the channel information stored in the broadcasting signal can be appropriately modified according to the transmitting channel.

In order to achieve at least the above-described objects of the present invention in a whole or in parts, there is provided a method of processing information in a digital translator of a digital system that includes detecting a data frame start time of a data frame from a received digital broadcasting signal, determining whether channel information stored in the detected data frame is identical to prescribed channel information, and modifying the channel information stored in the data frame according to the prescribed channel information when the channel information stored in the data frame is not identical to the prescribed channel information.

To further achieve at least the above-described objects of the present invention in a whole or in parts, there is provided a method of processing channel information in a digital TV translator that receives a digital broadcasting signal that includes checking a frame start position of a MPEG-II transport stream by searching a synchronization bit, wherein the MPEG-II transport stream is extracted from the digital broadcasting signal, searching an identification data field value of the MPEG-II transport stream to determine whether the identification data field value is a prescribed value, determining whether channel information stored in a transport stream identifier field of the MPEG-II transport stream is identical to a specified channel information when the identification data field value is the prescribed value, modifying the stored channel information of the MPEG-II transport stream by inserting the specified channel information to the transport stream identifier field when the stored channel information is not identical to the specified channel information, and modifying error-correction data of the modified MPEG-II transport stream when the stored channel information is modified.

To further achieve at least the above-described objects of the present invention in a whole or in parts, there is provided a digital TV translator that receives a digital broadcast signal that includes a shifter that receives data extracted from the digital broadcast signal, a controller coupled to the shifter that modifies channel information in the received data according to prescribed channel information when an identification data field value of the received data is a prescribed value, an error-correction generator coupled to the controller that modifies an error-correction bit in the received data based on a control signal of the controller and the identification data field value, a channel information input device coupled to the controller that supplies the prescribed channel information to the controller, and an encoder that encodes the received data outputted by the shifter and the modified received data outputted by the flow controller for transmission to a transmitting terminal of the digital TV translator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In a receiving terminal (not shown) of a preferred embodiment of a digital TV translator, the broadcasting signal received from the digital broadcasting transmitter is demodulated and preferably converted into a MPEG-II transport stream data format before transfer to the transmitting terminal (not shown). However, the present invention is not intended to be so limited. For example, alternative data formats other than MPEG-II can be used. The MPEG-II transport stream is frequently used in digital data transmission because it has a high compression rate.

Figure 1:
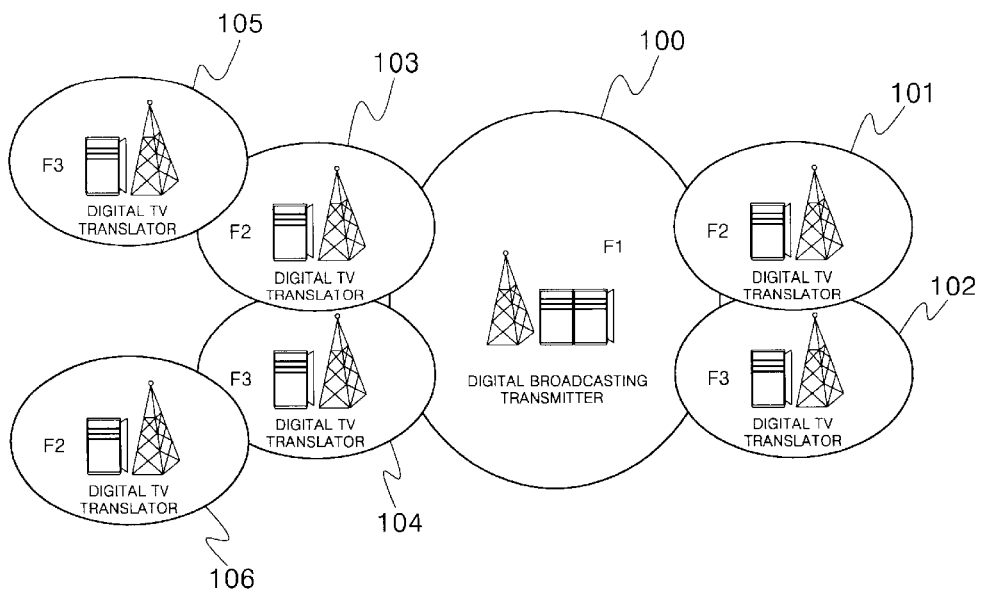
FIG. 1 illustrates a digital TV broadcasting transmit system using a related art digital TV translator.
Figure 2:
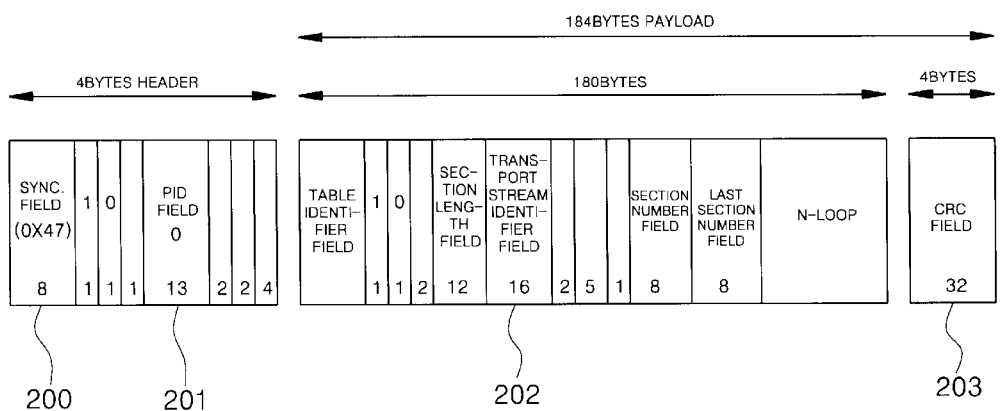
FIG. 2 is a diagram that illustrates a data format of a broadcasting signal transmitted from a digital TV translator.

A data format shown FIG. 2 utilizes the Program Association Table (PAT) format of Personal Identification Data (PID) where PBD=0 in MPEG-II transport stream. Such MPEG-II transport stream preferably includes a total of 188 bytes, in which the first 4 bytes are a header, and the remaining 184 bytes are a payload. The MPEG-II transport stream consists of the PID field 201 value of a header '0' is PAT. Such a PAT supplies the interrelationship to the PID value of the transport packet having a program number and contents of the program. That is, the demultiplexer of the digital TV receiver reads the PAT of the transmitted MPEG-II transport stream thereof in order to classify the data of each MPEG-II transport stream and display images on the screen or output the sound through the speaker.

A transport stream identifier 202 among the payload of PAT is preferably used to display the transport channel of MPEG-II transport stream that is being transmitted. Therefore, in the digital TV receiver, the channel information of the received MPEG-II transport stream can be recognized by checking the transport stream identifier 202. However, as discussed above, in the related art digital broadcasting system, instabilities may occur in the receiver of the digital TV directly receiving the broadcasting signal from the digital TV translator because the actual channel receiving the broadcasting signal is not identical to the channel information stored in the extracted data of the MPEG-II transport stream after the received signal is demodulated. In order to prevent such an instability or mix-up, the preferred embodiment of the digital TV translator must convert the channel information transmitted to the digital broadcasting transmitter, which is an RF channel number, to make it identical with the channel information stored in the MPEG-II transport stream data transmitted to the subscribers. Accordingly, in the preferred embodiment of the digital TV translator, before the MPEG-II transport stream is transmitted, the channel information stored in the transport stream identifier 202 of the PAT therein is converted to be equal to the transport channel information of the subscriber, and a Cyclic Redundancy Check (CRC) 32 field 203 is converted to correct error bit(s) of MPEG-II transport stream data.

As described above, the preferred embodiment of the digital TV translator converts the channel information specified in the MPEG-II transport stream according to the corresponding channel information that is being used before the broadcasting signal is transmitted. The present invention can include a modification apparatus of the channel information to perform the function described above.

Figure 3:
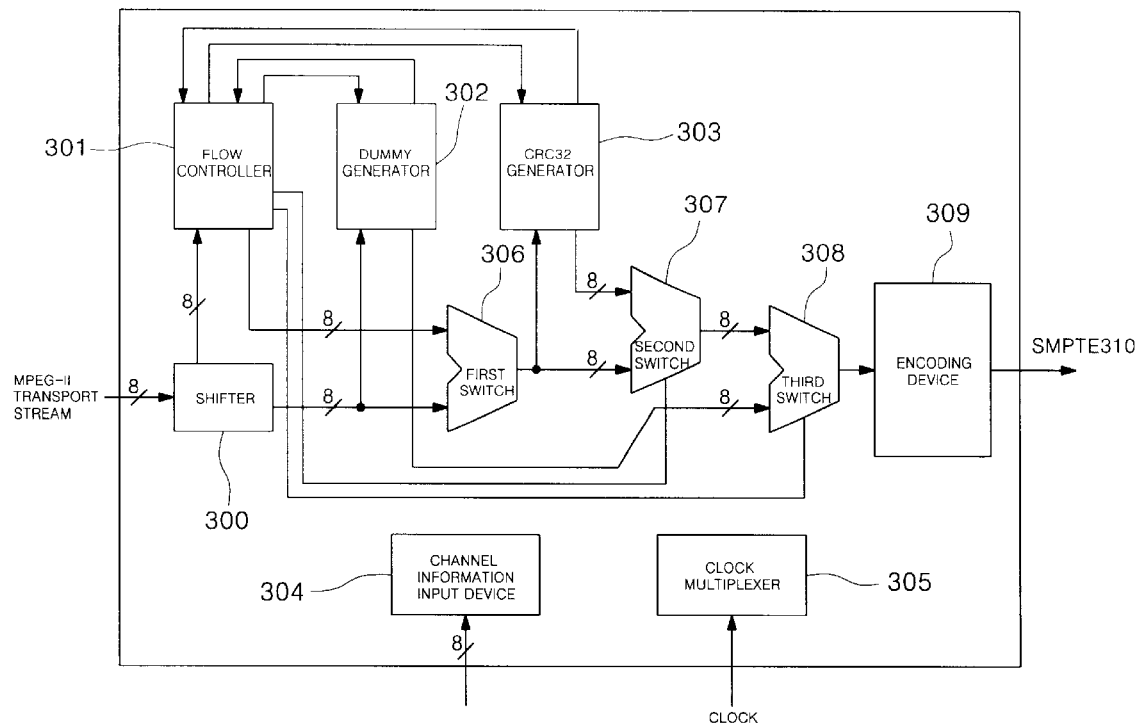
FIG. 3 is a block diagram that illustrates a preferred embodiment of an apparatus for use with a digital TV translator according to the present invention.

As illustrated in FIG. 3, an exemplary apparatus that modifies the channel information in the preferred embodiment of the digital TV translator according to the present invention includes a shifter 300, a controller, a dummy generator 302, a CRC32 generator 303, a channel information input device 304, a clock multiplexer 305, first-third switches 306–308 and an encoding device 309.

The shifter 300 is for inputting the MPEG-II transport stream extracted from the receiver, and the controller such as a flow controller 301 is for controlling the modified channel information by checking the MPEG-II transport stream stored in the shifter 300. The dummy generator 302 is for generating the dummy-data to maintain synchronization of the digital TV translator. The CRC32 generator 303 is for altering an error-correction bit at the same time as the conversion of the channel information by the flow controller 301. The channel information input device 304 is for connecting to an input device such as an outside computer to store the latest channel information in the MPEG-II transport stream or to set up the channel information, and the clock multiplexer 305 is for multiplexing a supplied clock.

The first switch 306 outputs the corresponding value through a switching function based on the input from the shifter 300 and the flow controller 301. The second switch 307 outputs the corresponding value based on input from the first switch 306 and the CRC32 generator 303 through a switching function, and the third switch 308 outputs the corresponding value based on input from the second switch 307 and the dummy generator 302 through a switching function. The encoding device 309 is for coding the value of the MPEG-II transport stream based on the specified standards and transmitting the same.

Operations of the exemplary modification apparatus in the preferred embodiment of the digital TV generator will now be described. When the preferred embodiment of the digital TV translator receives the broadcasting signal transmitted from the digital broadcasting transmitter, the receiver of the digital TV translator demodulates the received broadcasting signal and converts to the base-band frequency before transmitting the MPEG-II transport stream using the synchronized clock. The MPEG-II transport stream is inputted to the exemplary modification apparatus of the preferred embodiment prior to transmission to the transmitter. Since the inputted MPEG-II transport stream preferably consists of 8 bit parallel data, 8 bits in the shifter 300 is formed to store the MPEG-II transport stream. However, the present invention is not intended to be so limited. Then, the flow controller 301 receives the MPEG-II transport stream from the shifter 300 and performs the synchronization bit detection process among the inputted MPEG-II transport stream to determine a start point of the frame.

Thereafter, the PID field of MPEG-II transport stream preferably is searched to check whether or not the PID value is '0'. If PID value is not '0', then the switches 306, 307, 308 are opened and the MPEG-II transport stream stored in the shifter 300 is directly transmitted to the encoding device 309. If the PBD value is '0', then the channel information (e.g., RF channel number), which is preferably previously established in the channel information input device 304, is read and inserted to the transport stream identifier of MPEG-II transport stream. At this time, since the channel information input device 304 can be connected with an outside computer or the like, the arbitrary channel information can be inserted in the transport stream identifier according an operator or the like.

As the channel information of the transport stream identifier is modified, the flow controller 301 drives the CRC32 generator 303 to set up new error-correction bit(s) related to the MPEG-II transport stream. That is, the CRC32 generator 303 determines at least the CRC32 bit, which is then inserted to the last 4 byte position of the MPEG-II transport stream. When the modification of the channel information is completed, the flow controller 301 controls (i.e., opens) the first, second and third switches 306, 307, 308 to transmit the MPEG-II transport stream to the encoding device 309. The encoding device 309 performs the line coding of MPEG-II transport stream based on the specified standards, which is preferably 'SMPTE310', before transmitting the line coding to the modulator of the transmitter. In the event that the preferred embodiment of the digital TV translator does not correctly receive the broadcasting signal because of the variance of the surroundings, the third switch 308 preferably performs switching of the dummy-data generated in the dummy generator 302 and MPEG-II transport stream data.

Figure 4:
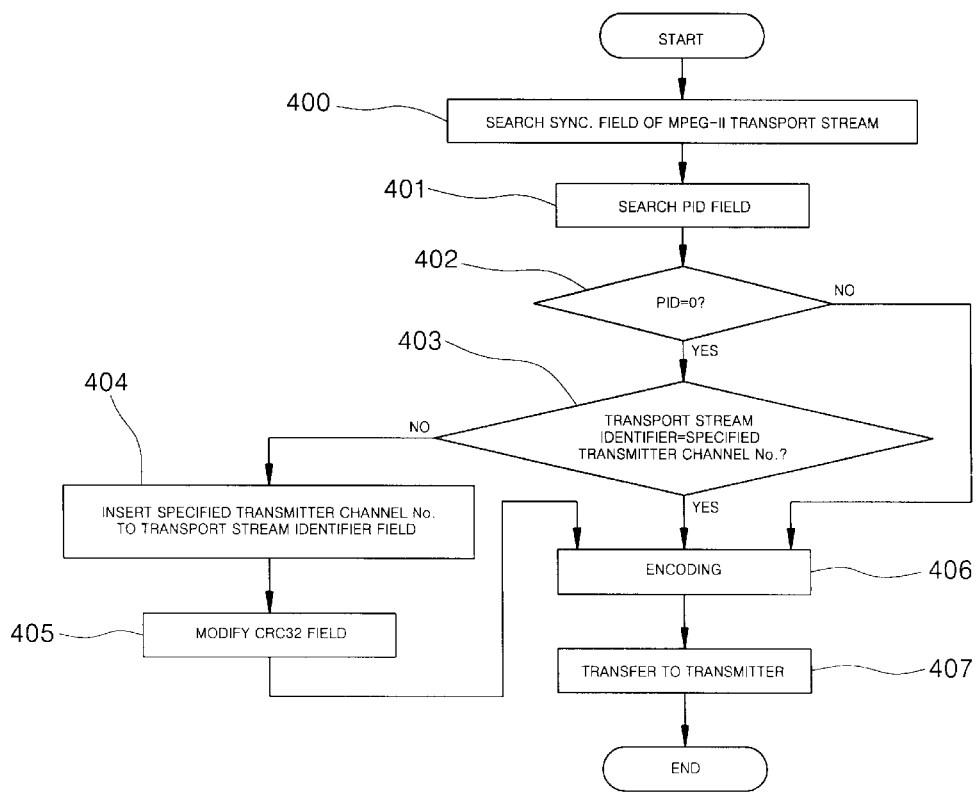
FIG. 4 is a flow diagram that illustrates a preferred embodiment of a process of operating a digital translator according to the present invention.

Referring to FIG. 4, operations of a preferred embodiment of a method of modifying channel information in a digital translator in accordance with the present invention will now be described. As shown in FIG. 4, after a process begins, control continues to step 400 where synchronization is performed preferably by finding a synchronization field 200 of a MPEG-II transport stream, which is searched and can be stored in the shifter 300, for example. The flow controller 301 can be used for such a search. The synchronization field 200 located at the start field of 188 bytes of MPEG-II transport stream indicates start of a frame.

Once the synchronization is performed, control continues to step 401 where the flow controller 301 searches PID field 201 being 13 bits located in the header. From step 401, control continues to step 402 where it is determined whether the PID field 201 is '0' or not to judge if the MPEG-II transport stream, which can be stored in the shifter 300, is the PAT.

If the result of step 402 indicates that the PID field 201 is not '0', control jumps to step 406 for encoding. This can be performed, for example, by the exemplary modification apparatus for the channel information ceasing operation and the received MPEG-II transport stream being directly transmitted to the encoding device 309. Whereas, if the PD field is '0' in step 402, then control continues to step 403 where the transport stream identifier field 202 of the payload is checked to determine whether the channel information stored in the transport stream identifier field 202 is identical to the specified channel information or not.

If the result of step 403 indicates that the channel information stored in the transport stream identifier field 202 is identical to the specified channel information, then control jumps to step 406. However, if the channel information stored in the transport stream identifier field 202 is not identical to the specified channel information in step 403, then control continues to step 404 where the channel information is modified as the specified channel information is inserted to the transport stream identifier field. At this time, the modification of the channel information can be arbitrary established, for example, through communicating with the outside computer or operating the switch.

As a result, when the channel information is modified, an error connection signal such as the CRC32 field located at the last location of MPEG-II transport stream is also modified in step 405. The modification takes place because of the CRC32 field has been inserted in the remaining 180 bytes, exclusive of 4 bytes, of the header in PAT of MPEG-II transport stream, and if the contents of the transport stream identifier is modified, then the CRC32 field corresponding to the modified information must be re-established.

After CRC32 field is modified in step 405, control continues to step 406 where the MPEG-II transport stream is transmitted to the encoding device 309. In the event that a long distance transmitting of the MPEG-II transport stream is required, the encoding device 309 performs the line encoding of the MPEG-II transport stream for easy demodulation at the receiver end in step 406. From step 406, control continues to step 407 where the encoded MPEG-II transport stream is transmitted to the transmitter and the process ends.

As described above, the preferred embodiments according to the present invention have various advantages. In the preferred embodiments of a modification apparatus of a digital TV translator and method of operating a digital TV translator, the channel information of the transmitted broadcasting signal is modified to the prescribed channel information of the transmitter when the receiver channel of the broadcasting signal is not identical to the transmitter channel of the broadcasting signal to prevent mix-up due to demodulation of the broadcasting signal in the receiving digital TV and provide stable TV broadcasting service.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of processing information in a digital translator of a digital system comprising:
   detecting a data frame start time of a data frame from a received digital broadcasting signal;
   determining whether channel information stored in the detected data frame is identical to prescribed channel information; and
   modifying the channel information stored in the data frame in a data stream according to the prescribed channel information when the channel information stored in the data frame is not identical to the prescribed channel information.

2. The method of claim 1, further comprising transmitting the channel information stored in the data frame if the result of determining whether channel information is identical indicates that the channel information stored in the data frame is identical to the prescribed channel information.

3. The method of claim 1, further comprising transmitting the modified channel information stored in the modified data frame if the result of determining whether channel information is identical indicates the channel information stored in the data frame is not identical to the prescribed channel information.

4. The method of claim 1, wherein modifying the channel information externally inputs the modified channel information.

5. The method of claim 1, further comprising modifying an error-correction bit field of the modified data frame according to the modified channel information.

6. A method of processing channel information in a digital TV translator that receives a digital broadcasting signal, comprising:

checking a frame start position of a MPEG-II transport stream by searching a synchronization bit, wherein the MPEG-II transport stream is extracted from the digital broadcasting signal;

searching an identification data field value of the MPEG-II transport stream to determine whether the identification data field value is a prescribed value;

determining whether channel information stored in a transport stream identifier field of the MPEG-II transport stream is identical to a specified channel information when the identification data field value is the prescribed value;

modifying the stored channel information of the MPEG-II transport stream by inserting the specified channel information to the transport stream identifier field when the stored channel information is not identical to the specified channel information;

modifying error-correction data of the modified MPEG-II transport stream when the stored channel information is modified; and transmitting the modified MPEG-II transport stream to a plurality of users.

7. The method of claim 6, whether the channel information stored in the transport stream identifier field is identical to the specified channel information by checking the transport stream identifier field when the identification data field value is '0'.

8. The method of claim 6, wherein the transmitting comprises transmitting the stored channel information in the MPEG-II transport stream when the stored channel information is identical to the specified channel information.

9. The method of claim 6, wherein the transmitting comprises transmitting the modified channel information stored in the modified MPEG-II transport stream when the stored channel information is not identical to the specified channel information.

10. A digital TV translator that receives a digital broadcast signal, comprising:

a shifter that receives data extracted from the digital broadcast signal;

a controller coupled to the shifter that modifies channel information in the received data according to prescribed channel information when an identification data field value of the received data is a prescribed value;

an error-correction generator coupled to the controller that modifies an error-correction bit in the received data based on a control signal of the controller and the identification data field value;

a channel information input device coupled to the controller that supplies the prescribed channel information to the controller; and an encoder that encodes the received data outputted by the shifter and the modified received data outputted by the flow controller for transmission to a transmitting terminal of the digital TV translator.

11. The digital TV translator of claim 10, wherein the encoder encodes the received data from the shifter when the identification data field value is the prescribed value and the channel information in the received data is equal to the prescribed channel information.

12. The digital TV translator of claim 10, wherein the encoder encodes the modified received data having the channel information in the received data set to equal the prescribed channel information and the modified error-correction bit when the identification data field value is the prescribed value and the channel information in the received data is not equal to the prescribed channel information.

13. The digital TV translator of claim 12, further comprising a dummy-data generator that generates a dummy-data to synchronize the received data, wherein said channel information input device is adapted to be coupled to an external computer to store a latest channel information for an MPEG-II transport stream, and wherein the encoder encodes using specified standards.

14. The digital TV translator of claim 13, wherein the latest channel information is the prescribed channel information, and wherein the controller sets the modified channel information equal to the latest channel information when the channel information in the received data is not identical to the latest channel information.

15. The method of claim 1, wherein the data frame modified is for retransmission to a plurality of users.

16. The digital TV translator of claim 10, further comprising a transmitter configured to transmit the broadcast signal to a plurality of end-users.

17. A method of retransmitting broadcast information to a plurality of end users comprising:

receiving a broadcast signal;

determining channel information stored in the broadcast signal;

comparing the channel information stored in the broadcast signal with prescribed channel information;

modifying the channel information stored in the broadcast signal when the channel information stored in the broadcast signal differs from the prescribed channel information; and transmitting the modified broadcast signal to a plurality of end users.

18. The method of claim 17, further comprising:
demodulating the received broadcast signal; and
converting the received broadcast signal to an intermediate frequency.

19. The method of claim 17, further comprising performing error correction on the received broadcast signal.

20. The method of claim 17, wherein the prescribed channel information is a channel used to transmit the modified broadcast signal to the plurality of end users and the modified broadcast signal is transmitted to the plurality of end users for further processing and display.

* * * * *